(12) United States Patent
Gouder De Beauregard et al.

(10) Patent No.: US 7,620,750 B2
(45) Date of Patent: Nov. 17, 2009

(54) TIME BUDGETING BY DETERMINING STATUS OF A STREAMING BUFFER DURING AN AUTONOMOUS NON-DATA TRANSFER OPERATIONS IN DRIVE UNITS

(75) Inventors: Arnaud Frank Wilhelmine Gouder De Beauregard, Susteren (NL); Markus Wilhelmus Maria Coopermans, Helden (NL); Josephus Joannes Mathijs Maria Geelen, Susteren (NL); Wilhelmus Antonisu Henricus Stinges, Reuver (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 267 days.

(21) Appl. No.: 11/572,296

(22) PCT Filed: Jul. 18, 2005

(86) PCT No.: PCT/IB2005/052381

§ 371 (c)(1),
(2), (4) Date: Jan. 18, 2007

(87) PCT Pub. No.: WO2006/011106

PCT Pub. Date: Feb. 2, 2006

(65) Prior Publication Data

US 2007/0226397 A1 Sep. 27, 2007

Related U.S. Application Data

(60) Provisional application No. 60/589,359, filed on Jul. 20, 2004.

(51) Int. Cl.
G06F 13/00 (2006.01)
G06F 12/00 (2006.01)
(52) U.S. Cl. .............................. 710/33; 710/52; 710/53; 710/60; 711/100; 711/114
(58) Field of Classification Search .................. 710/33, 710/52, 53, 60; 711/100, 114
See application file for complete search history.

(56) References Cited

U.S. PATENT DOCUMENTS

2006/0262691 A1 11/2006 Lenaerts

FOREIGN PATENT DOCUMENTS

EP 1160787 A2 * 12/2001
WO WO2004/102559 A1 11/2004

* cited by examiner

Primary Examiner—Tammara Peyton (57) ABSTRACT

Between data accesses to a storage medium, requested by an initiator, a logical unit may need to perform autonomous operations. The logical unit receives information from the initiator to allow the logical unit to estimate whether the stream buffer of the initiator is reaching a critical level. Based on this estimate, the logical unit can determine whether to perform or continue autonomous operations such as error recovery; physical maintenance of a drive mechanism or storage medium; or relative positioning between the drive mechanism and storage medium. The estimate also allows a flexible, rather than a fixed, time-out.

11 Claims, 9 Drawing Sheets

TIME BUDGETING BY DETERMINING STATUS OF A STREAMING BUFFER DURING
AN AUTONOMOUS NON-DATA TRANSFER
OPERATIONS IN DRIVE UNITS

CROSS REFERENCE TO RELATED
APPLICATION

This application claims the benefit of U.S. provisional application Ser. No. 60/589,359 filed Jul. 20, 2004, which is incorporated herein on whole by reference.

The invention relates to the field managing data transfers between an initiator unit and a logical unit, particularly with use of a stream buffer in the initiator unit.

In a processing situation, there is at least one host (also known as initiator) processor running one or more applications which provide or consume data. The host processor typically interfaces with peripherals, such as drive units (also known as logical units). The drive units generally have some local processing capability and at least one medium from which data is read or to which data is written. There are many types of media, such as optical, magnetic, and electronic.

In order to interface with media, application programs will often have a large buffer. If an application is consuming data, when the buffer fullness falls below some threshold level, the application program will issue one or more read commands requesting additional data from the relevant drive unit. If an application program is producing data, when the buffer emptiness falls below a threshold level, the application program will issue at least one write command to the relevant drive unit.

There are many examples of buffering data when reading from and writing to various types of media. An example of such buffering can be found in PCT application IB2004/0506 (NL030617) incorporated herein by reference, which describes how the drive unit adapts the transfer rate with which it retrieves data from the medium to attempt to match the application transfer rate. This application only applies to reading, and can (and does) take buffer fullness of the drive unit's own buffer into account. The drive unit does not know anything about the application's buffer.

One problem that has been discovered by the inventors is that timing related to data accesses is not only relevant to satisfying the application program. Sometimes the drive unit itself needs to perform autonomous non-data transfer operations. Such operations include error recovery, physical maintenance of the drive unit or storage medium, and relative positioning between a drive mechanism and the storage medium. Generally such operations use the same resources as data accesses to the storage medium and therefore cannot be performed at the same time as such accesses. As a result, the drive unit needs to know if it has time for such autonomous operations in addition to knowing whether it can satisfy the application program.

It would be desirable to have the host processor, which is running the application program, supply information to the drive unit to allow the drive unit to determine how much time remains before loss of streaming. The drive unit can use this information to adjust its internal operations, for instance by implementing a flexible time-out or by deciding whether it can successfully perform autonomous non-data transfer operations before commencing such operations. Autonomous operations may be of many different sorts, for instance in the categories of error recovery; physical maintenance of the drive mechanism or data storage medium; or relative positioning between the drive mechanism and the storage medium.

Objects and advantages of the invention will be apparent in the following.

Figure 1:
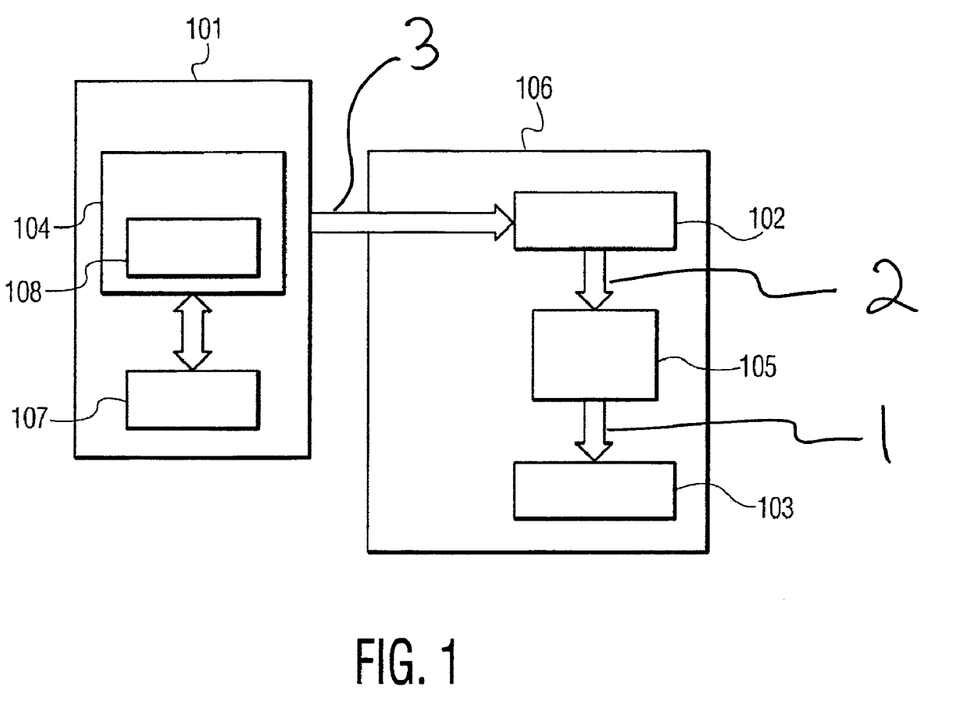
FIG. 1 shows a schematic of a device in accordance with the invention during a read operation.

FIG. 1 shows a schematic diagram of an example of a device in which the invention can be used. This schematic is organized to show a read operation with streaming.

The device includes a data source 101, which includes a logical unit 104 and some medium or media 107. Herein the terms "drive unit" and "logical unit" will be used interchangeably. The medium 107 might be optical, such as CD (compact disc), DVD (digital video disc), HD-DVD (high definition digital video disc), or BD (blu-ray disc). The medium 107 might also be of some other type such as magnetic or electronic.

The device also includes a host 106 that uses data from source 101. Herein the terms "host" and "initiator" will be used interchangeably. The host 106 might be of any type, such as a PC, a digital signal processor, a set top box, or the like. The host 106 may be in the same housing with the logical unit 104 or in a different housing. Within the initiator unit 106 is a collector module 102 that collects a data stream 3 from the logical unit 104 within the source 101. A stream buffer 105 receives data 2 from the collector and provides streamed data 1 to the consumer 103. The stream buffer is preferably 105 a large buffer. The data flow 3 occurs via an interface (not shown). The consumer module 103 is part of an application program that uses the streamed data 1.

The consumer 103 has a known, maximum data rate at which it can remove data from the stream buffer 105. This rate is called the consumption rate. The interface has a known minimum data transfer rate. This rate is called the interface rate. The source 101 has a known, minimum streaming data rate from the media into the logical unit's cache or buffer 108. This minimum streaming rate is called the source rate. In general the consumption rate is less than the source rate which in turn is less than the interface rate.

The logical unit buffer 108 is optional. Those of ordinary skill in the art could design a drive unit without it.

In general, reading commands may be of many different types. Some require streaming performance and some do not. The invention is particularly useful in situations where streaming performance is required. For instance, the MMC command set has more than one read command, including:

Read(10)

Read(12)

The number (10 or 12) says from how many bytes the command descriptor block is constructed. The differences between the two commands are:

- The Read(10) command has a 2-byte parameter for specifying the number of sectors to be transferred, whereas the Read(12) command has a 4-byte parameter.
- Only the Read(12) command has a parameter that indicates that the host wants a "streaming" transfer. To the drive, this means that it is more important to deliver data (which may be faulty or fabricated) on time than to perform retries to deliver the correct data (but maybe with a delay). It is this streaming situation in which the invention is particularly useful.

Before the application has started to send data to the consumer, there is not truly a real-time constraint. Therefore, it is possible to do the initial filling of the buffer with Read(10) commands, or with Read(12) commands with the "streaming" parameter switched off. After the dataflow to the consumer has been started, the Read(12) command is one that can be used to indicate streaming transfer requests to the logical unit.

Figure 3A:
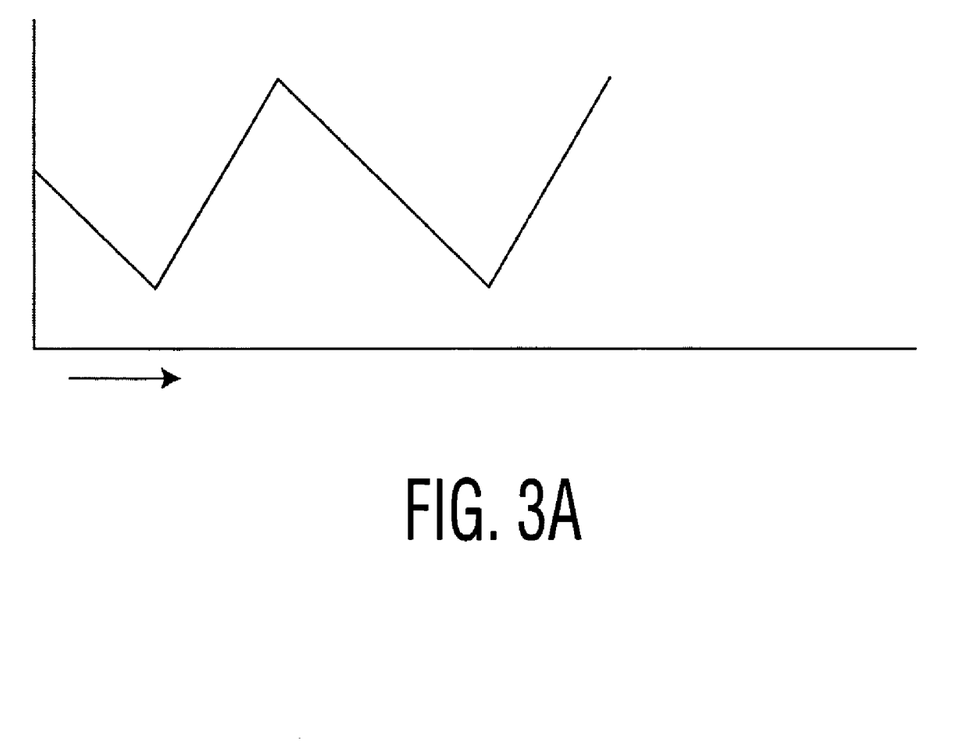
FIG. 3a is a graph of buffer filling as a function of time.

FIG. 3a shows a graph of buffer fullness on the vertical axis against time during a data consumption operation. Buffer fullness falls during data consumption, until it reaches a threshold or trigger level. At that point, a new data transfer operation is initiated by the application using the drive unit, which causes buffer fullness to increase again. Typically, data will be transferred until the buffer reaches a second threshold, which is full enough that the application stops requesting further transfers. From the point of view of the host, this is the preferred point for initiating autonomous operations if there is time, but the drive does not know when this moment is, so it needs to receive enough information to be able to perform the autonomous operation and still satisfy the host's needs.

Figure 2:
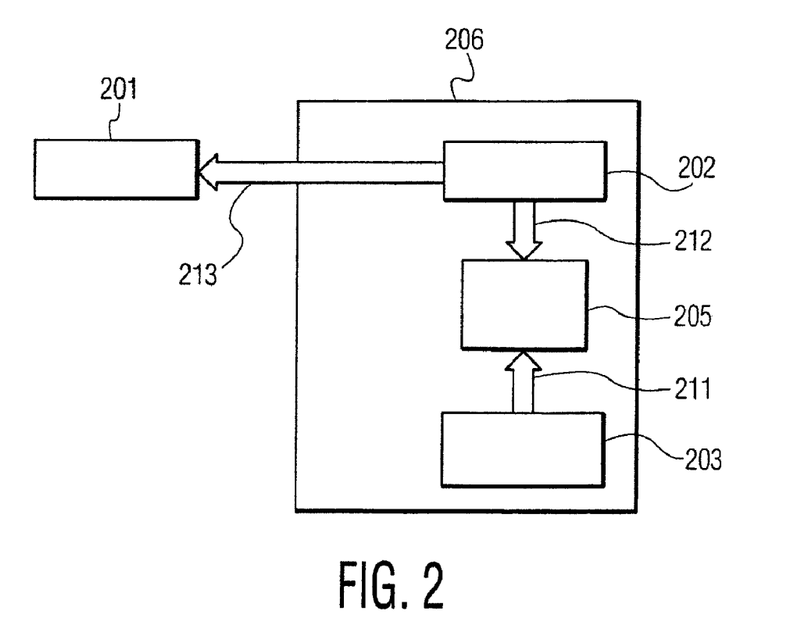
FIG. 2 shows a schematic of a device in accordance with the invention during a write operation.

FIG. 2 shows a schematic, analogous to FIG. 1, of an example of a device in accordance with the invention during a write operation. In this case, a data generator module 203 provides data 211 to the stream buffer 205 at a rate called the generation rate. The stream buffer 205 provides data 212 to the combiner module 202, which in turn provides data 213 via the interface (not shown) to the destination 201 at a rate called the interface rate. Then the destination module 201 writes to its local medium—shown in FIG. 1, but not here—at a rate called the destination write rate. It is possible that the modules of FIG. 2 are identical to the analogous modules in FIG. 1—i.e. to the modules having the same last two digits in their reference numerals—depending on the application. Alternatively, they may be different modules. In order to make sure that all data that the application produces can be recorded, the rate at which the drive unit is able to write needs to be larger than the generation rate. This must not be hampered by an interface transfer rate that is too low.

Again there are many different commands that can be used to signal to the logical unit that streaming transfer performance is required in the write situation, such as the MMC-4 Write(12) command.

FIG. 3a can also be used as an illustration of buffer emptiness as a function of time during a write operation. In other words, during a write, the buffer emptiness will go down until it reaches a threshold or trigger value at which point data transfer is initiated by the application using the drive unit. The data transfer gradually increases buffer emptiness until a second threshold is reached. The application program stops requesting data transfer after the second threshold is reached. This is a point at which the drive unit might be able to initiate autonomous operations. The drive unit does not know that the preferred point is reached, though. It only knows from the timer value and the amount of time that a recovery or a calibration will take that it has some 'time to breath.'

Normally information regarding the time available for autonomous non-data transfer operations should be communicated from the host 106/206 to the drive unit 101/201 using commands. Preferably such a command would include four parameters:

- an initial stream timing value (ISTV);
- a transfer unit size (TUS);
- a transfer unit increment (TUI);
- a write flag, indicating whether a read or write operation is desired.

These are just examples of how parameters might be set up. Those of ordinary skill in the art might devise other parameters. For instance, rather than sending a timing value, the application might send a data consumption rate and a quantification of the amount of data already in the streaming buffer. From these values the drive unit can calculate a time remaining. The consumption rate can be viewed as TUS/TUI.

Figure 7:
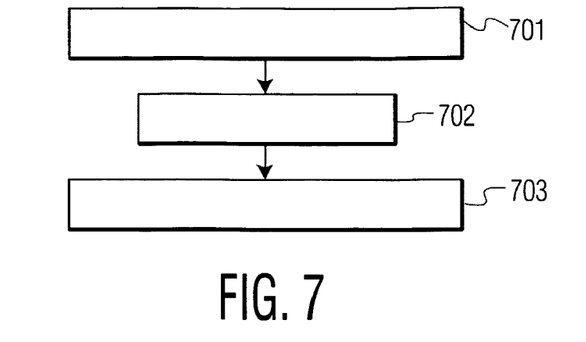
FIG. 7 shows a flowchart of a foreground process for a read operation.

FIG. 7 shows an example of a foreground process to operate in the drive unit for data transfer. First, at 701, the drive unit receives time-out parameters from the host unit, such as those listed above. Then, at 702, the drive unit stores the parameters. Then, at 703, the drive unit starts a time-out counter.

Figure 3B:
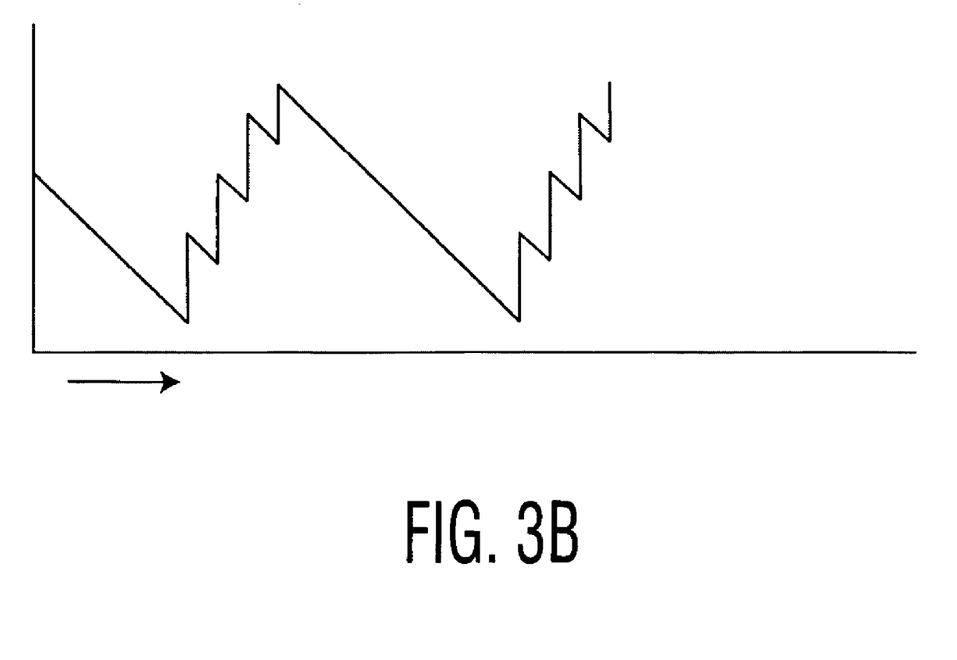
FIG. 3b is a graph is timer value as a function of time

The timer continuously counts down. Every time the drive transfers an amount of data of size TUS in the direction determined by the write flag, the drive may add TUI to the actual counter value. This is illustrated at FIG. 3b which graphs the value in the timer as a function of time. In this case, the increase of the counter value follows a jagged line. The addition of TUI will make the timer value go up at the end of transfer of a transfer unit, but during that same transfer the timer value will go down. Therefore the timer value is a jagged approximation or estimation of the value in the streaming buffer.

Figure 8:
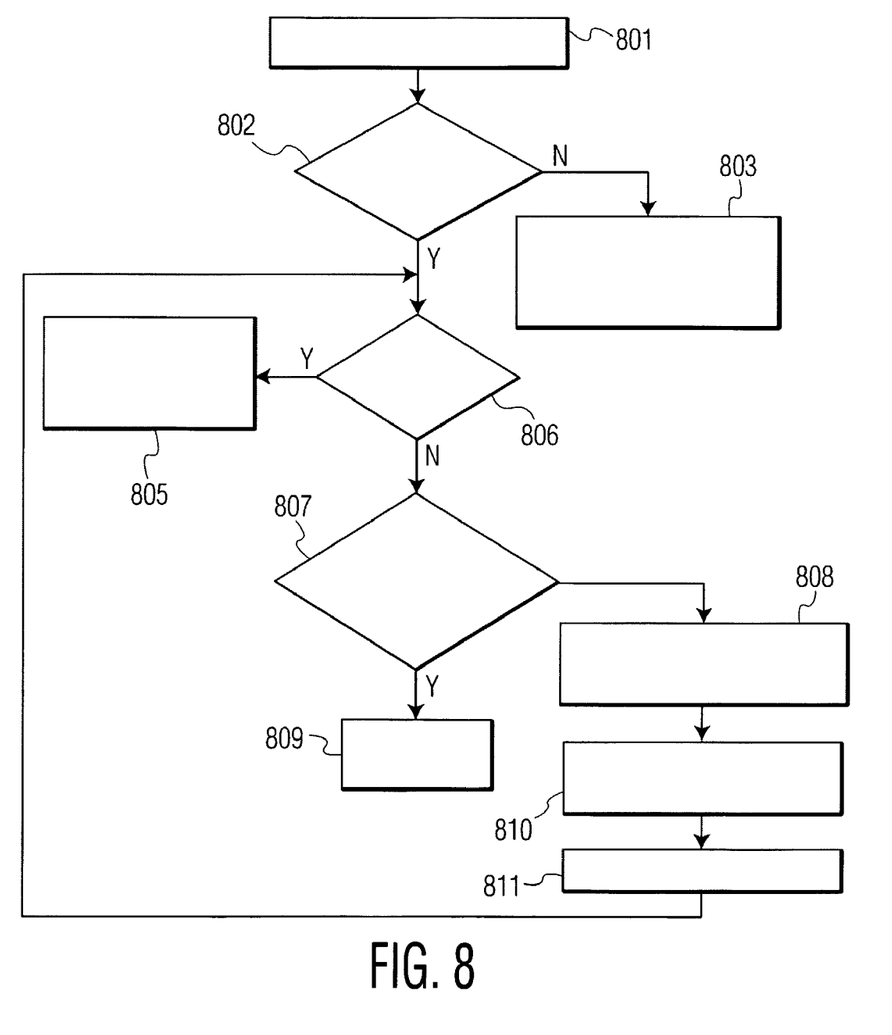
FIG. 8 shows a flowchart of a second foreground process for a read operation.

FIG. 8 shows a second foreground process for a read request to operate in the drive unit. At 801, the drive unit receives the read request. If the read command does not require streaming at 802, e.g. Read (10), then the command will be handled without a streaming requirement in 803. If, at 802, the read command does require streaming, e.g. Read (12), then the process tests at 806 whether the timer has expired. If so, the command will terminate with an error at 805. If not, the process tests at 807, whether all the data has been transferred. If so, the command is successfully completed at 809. Otherwise the foreground process can wait for data from the background process at 808. At 810, available data is transferred and then the timer is updated at 811. Then control returns to 806.

The Wait For Data from Background process function 808 may return very quickly if data has already been fetched from the disc by the background process. If not, the foreground process will be triggered by the background process as soon as data is available. Of course, a fatal error could occur, but this is not shown in the flowchart.

While handling a command without streaming requirements, the timer is still counting down—because the consumer is still using data from the application's stream buffer.

Suppose as well that the drive unit detects defects in the medium during a read operation, and needs to do recoveries and/or calibrations. The question is: how long is the drive allowed to spend on this recovery procedure without endangering the real-time requirements to the consumer? The answer depends in fact on the fullness of the application buffer. As long as this buffer is filled with data, the drive can go on with its recovery. But when the buffer occupation is getting close to zero then the drive's recovery must be stopped.

Generally, the application cannot stop the recovery, because the interface will not support this. As a result, the drive unit must stop the recovery itself, in response to the time out value in its local timer reaching some threshold level. Often the drive unit will have something of a buffer itself, also called cache 108 above, which can feed the host while the drive unit is performing autonomous operations. This may give a bit more time for the autonomous operations, but, since the buffer in the drive unit is generally small in comparison with the streaming buffer, this extra time may not be significant.

Figure 9:
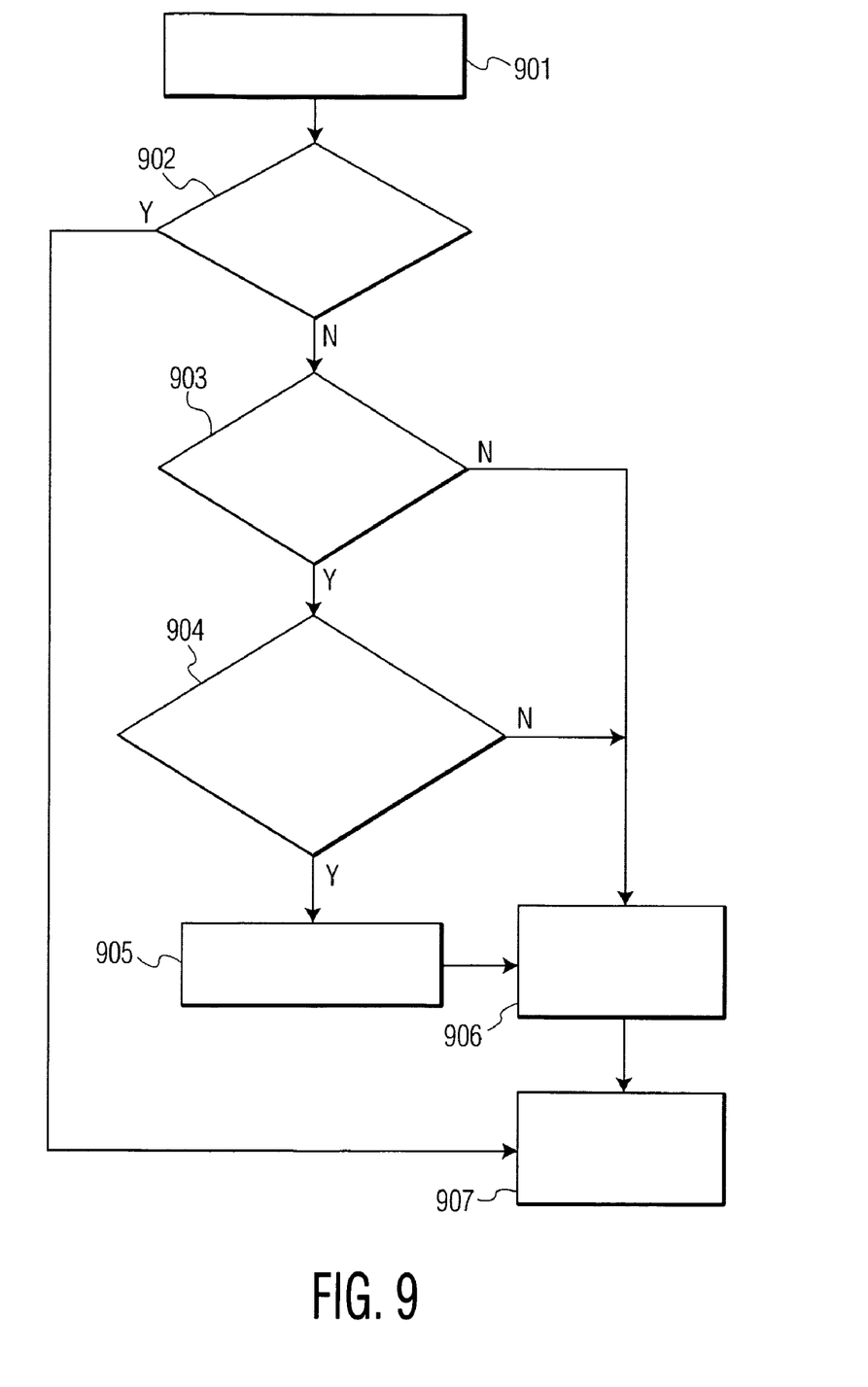
FIG. 9 shows a flowchart of a background process for a write operation.

FIG. 9 shows an example of a background read process, used by box 808. This particular process will seek to do the non-data transfer operation called calibration. When reading, the drive performs a task called pre-fetching. This means that the background process keeps reading data from the disc until the drive's buffer is full, such that it can anticipate a subsequent request from the application for more (consecutive data). This is what is happening in the loop: after having triggered the foreground process the background process can continue to read data or (if requested by the drive unit internally) perform a non-data transfer operation—so such an operation is preferably performed in the background process.

At 901, the background pre-fetches data into the drive unit buffer. Then at 902, it checks whether the data is available. If so, it triggers the foreground process at 907. If not, the process determines whether a calibration is pending at 903. If not, at 906, data is transferred from the drive to the buffer, and the foreground process is triggered at 907.

If a calibration is pending, the background process tests whether the time-out counter is sufficient for a non-data transfer operation at 904. If so, the non data transfer operation—in this case the calibration request—is performed at 905 and control passes to 906. If there is no time for the non-data transfer operation, then control passes directly to 906, bypassing 905.

The flowcharts of FIGS. 7-9 should operate in parallel.

Figure 4A:
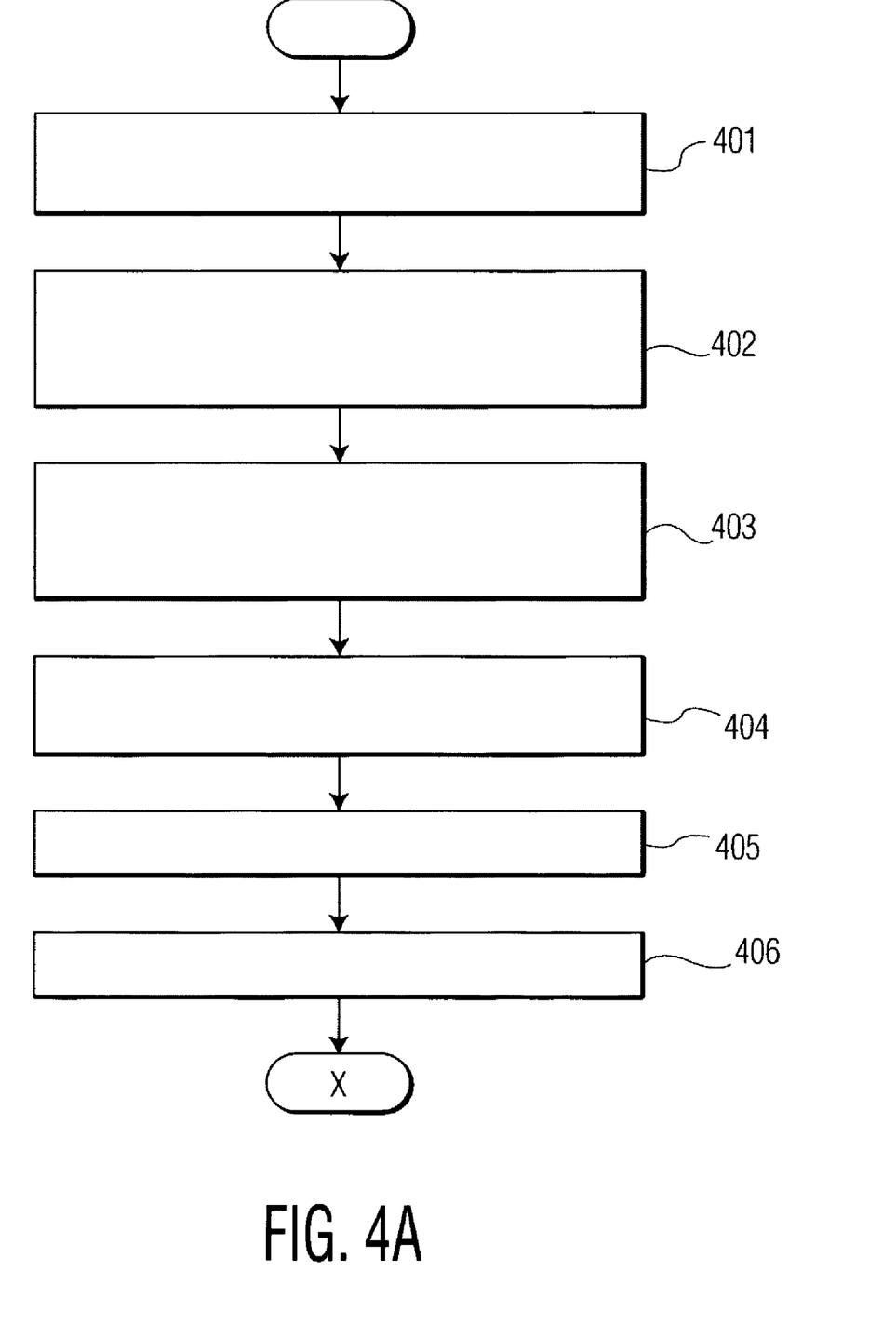
FIG. 4a is a first part of a flowchart relating to a read operation in accordance with the invention.
Figure 4B:
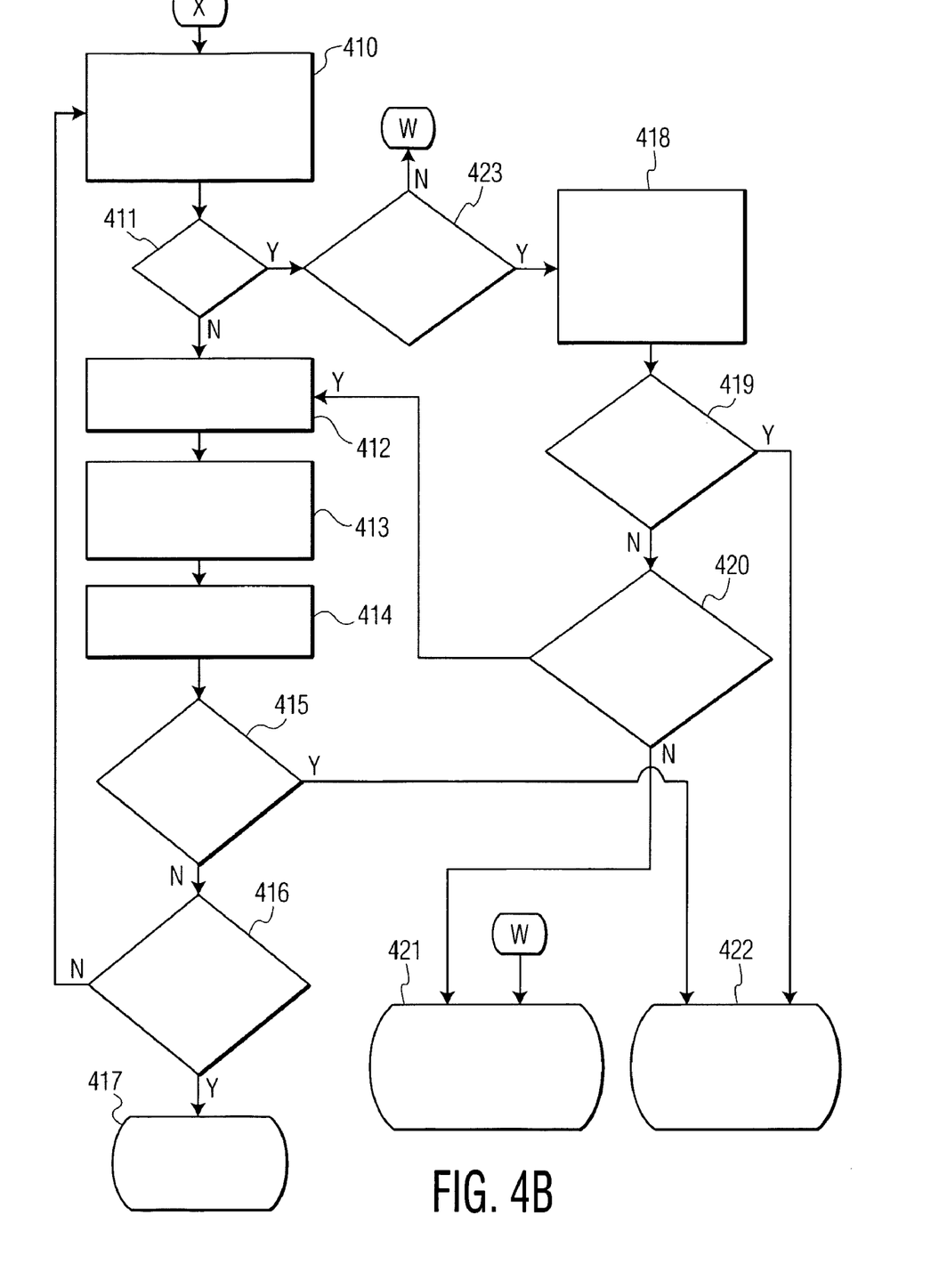
FIG. 4b is a second part of a flowchart relating to a read operation in accordance with the invention.

FIGS. 4*a* and 4*b* show an example of a flow chart for a read operation requiring an autonomous operation in accordance with the invention in the case of an error.

At 401, the host calculates the parameters ISTV, TUS, TUI & WRITE, the last of which is a flag. Then, at 402, the host sends the parameters via the 'stream timing descriptor' in the set streaming command, to be described below. The drive receives the set streaming command and gets the parameters from the stream timing descriptor at 403. Then the drive programs a down counter with ISTV and stores the other parameters at 404. The host now sends at least one read command, such as a read(12), at 405 and the drive receives the read command at 406. Flow chart connector X is used to connect the flow of execution between FIG. 4*a* and 4*b*. At 410, the drive reads one or more sectors from the disc. In case the drive unit also has a buffer, data may already be available.

During the read, some error may be discovered at 411 by the drive unit. If so, the drive must perform autonomous read recovery operations at 418. First the drive tests whether there is enough time to perform the autonomous operation at 423. If there is not enough time, the drive will produce an error message at 421 via connector W. If there is enough time, control passes to box 418. While performing these operations, the drive must also monitor the count-down counter/timer. If the count down reaches zero at 419 then the read times out at 422. If the count-down does not reach zero, but the read recovery is not successful at 420, then the read must terminate with an unrecoverable error at 421.

If the read recovery is successful, at 420, then the drive indicates data available at 412, which is also the outcome if there is no error at 411. The host can then transfer data from the drive to the host at 412, and the drive updates the down-counter at 414, as shown in FIG. 3*b*. This update of the down-counter implements a flexible time-out. If the drive down-counter reaches zero at 415 then a read time-out will also occur, resulting in an unsuccessful read termination at 422. If the drive down-counter has not reached zero at 415, the drive tests whether all requested data has been transferred at 416. If not, control returns to box 410. If so, then the drive signals that the transfer command has been successful at 417.

Figure 5A:
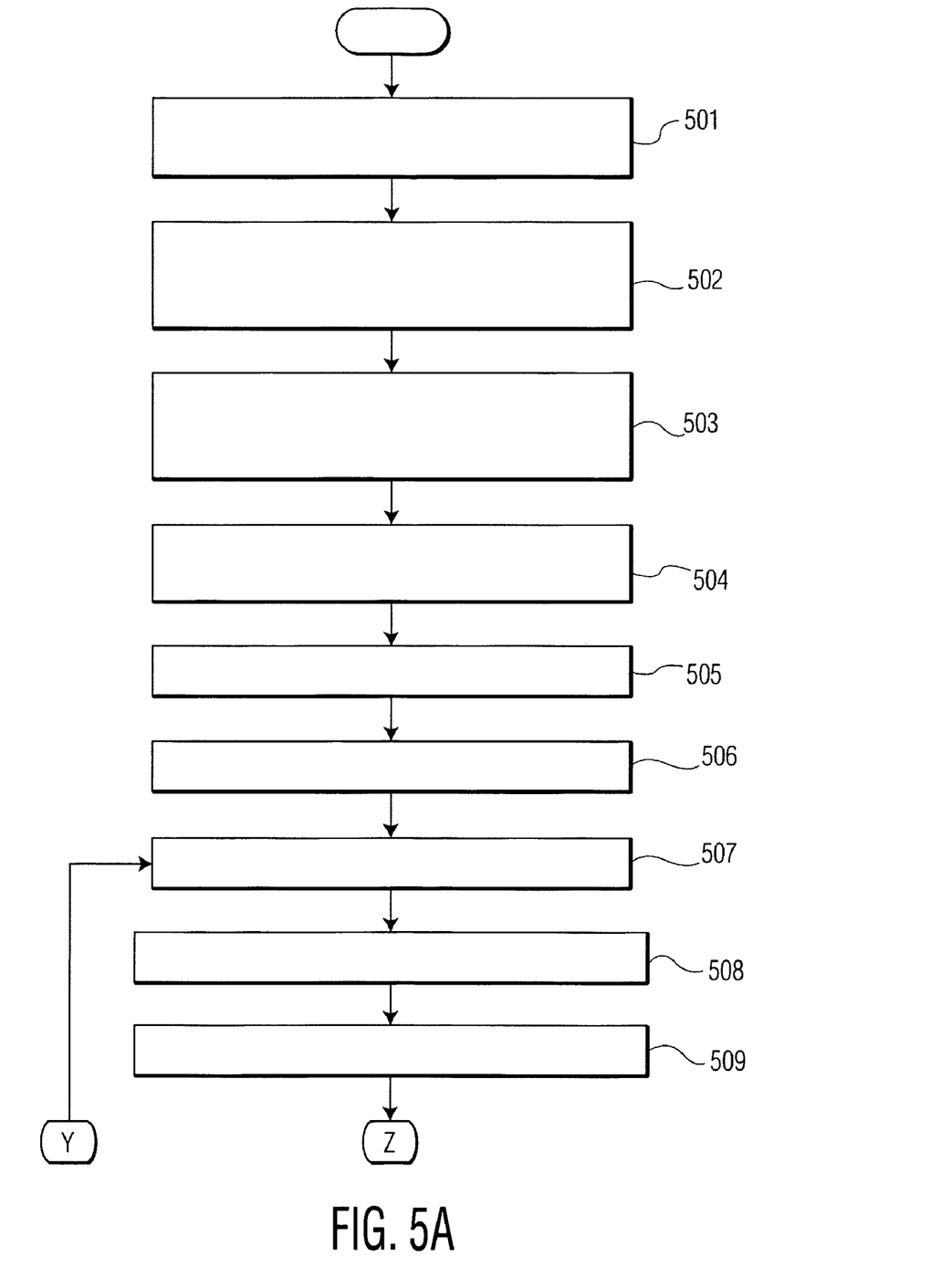
FIG. 5a is a first part of a flowchart relating to a write operation in accordance with the invention.
Figure 5B:
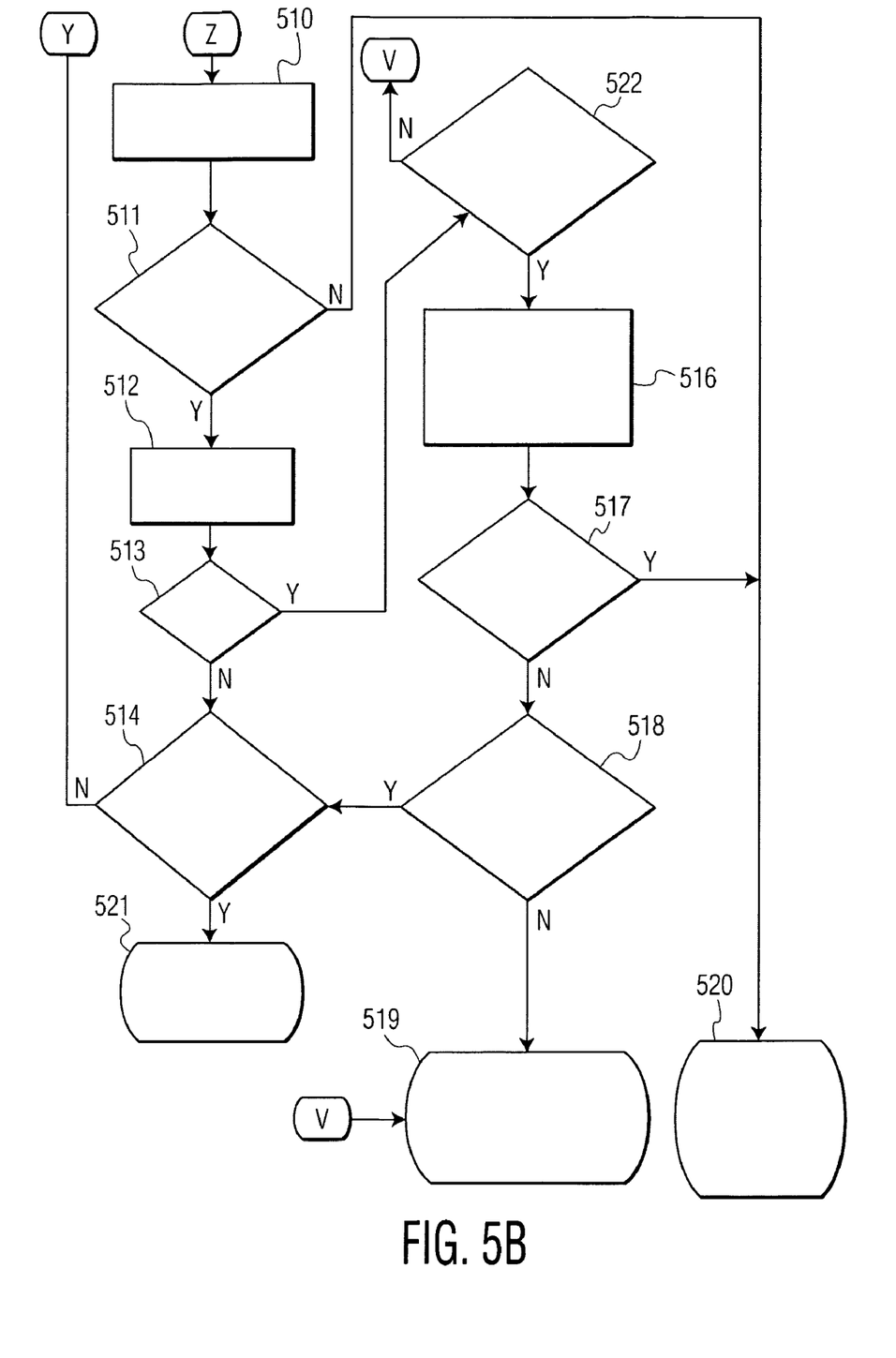
FIG. 5b is a second part of a flowchart relating to a write operation in accordance with the invention.

FIGS. 5*a* and 5*b* show an example of a flow chart for a write operation that requires an autonomous operation in accordance with the invention.

At 501, the host calculates the parameters ISTV, TUS, TUI & WRITE, the last of which is a flag. Then, at 502, the host sends the parameters via the 'stream timing descriptor' in the set streaming command. The drive receives the set streaming command and gets the parameters from the stream timing descriptor at 503. Then the drive programs a down counter with ISTV and stores the other parameters at 504. The host now sends at least one write command at 505 and the drive receives the write command at 506. At 507, the drive requests data from the host. The host then sends one or more blocks of data to the drive at 508, which the drive accepts at 509. Connectors Y and Z are used to connect the flow chart portions of FIGS. 5*a* and 5*b*. At 510, the drive updates the down-counter, i.e. the timer, thus implementing a flexible time-out.

If the down-counter reaches zero at 511, then the write command terminates due to a time-out condition at 520. If not, then the drive writes to the disc at 512. If an error is detected due to this write at 513, then the drive must perform autonomous write recovery at 516. First the drive must test at 522 whether there is time to perform the autonomous operation. If not, an unrecoverable error will be incurred at 519 via connector V. If there is time, then control passes to box 516. During the write recovery, the drive must also monitor the count-down at 517. If the drive's count-down reaches zero at 517, then the write command must terminate due to a time-out condition at 520. If not, then the drive tests whether the write recovery was successful at 518. If it was not successful, then the write command is terminated due to an unrecoverable error at 519. If the write recovery was successful, then control passes to box 514, which is also where control would have passed if no error was detected at 513.

At 514, the drive tests whether all relevant data has been transferred. If not, then control returns to block 507. If so, then the drive determines that the transfer command was successful at 521.

Operations 519, 520, 521, 417, 421 & 422 all require the drive to give a report to the host on the outcome of the data transfer operation.

The flow charts of FIGS. 4*a*, 4*b*, 5*a*, and 5*b* are written in a sequential type format, but they could also be set up in a parallel type format, analogous to FIGS. 7-9.

Drive units may perform other autonomous operations such as a layer jump; thermal management activity; or a retry. In general autonomous operations may be of many different sorts, for instance in the categories of physical maintenance of the drive mechanism or data storage medium; or relative positioning between the drive mechanism and the storage medium.

In any case, this type of autonomous operation should be transparent to the host. The foreground process that is handling a command is just waiting for data to arrive in the drive unit's cache. It has no idea of the reason why it is waiting for the data to arrive and it does not need to know.

Those of ordinary skill in the art can devise other implementations analogous to FIGS. 4a&b and 5a&b or analogous to 7-9 for these and for other types of autonomous operations, especially with minor modifications to boxes 410, 411, 418, 512, 513, and 516.

In the case of a layer jump, during a read, it could be performed as part of box 410. A layer jump is one example of a motion relative to the storage medium. Reading sectors from disc requires the optical head to be moved to the proper location. This may be on another layer, hence the layer jump.

The flowcharts show the autonomous operation terminating prematurely in the case of a time out on the streaming buffer. However, some autonomous operations are sufficiently critical that they should proceed even if there is a timeout. For instance, a thermal management operation may be necessary even if there is not enough time, to avoid damage to the storage medium. In such a case, the time-out error message could be issued after or in parallel with the thermal management activity.

Boxes 522 and 423 have to determine whether the time until loss of streaming is greater than the time necessary to perform the autonomous operation. Examples of the calculation of time until loss of streaming are shown in the following table:

TABLE 1

Time Remaining under Dynamic Conditions

| Time | Stream Buffer Depth | Time Until Loss of Streaming |
|---|---|---|
| 0 | X | (X*K)/C seconds |
| K | X − C | ((X − C)*K)/C seconds |
| 2*K | X − 2*C | ((X − 2*C)*K)/C seconds |
| ... | ... | ... |
| N*K | X − N*C | ((X − N*C)*K)/C seconds |
| (N + 1)*K | X − (N + 1)*C | ((X − (N + 1)*C)*K)/C seconds |

Where:
C is a number of byte groups consumed in an interval not smaller than K seconds;
N is a multiplier by which C can be multiplied to yield the preferred read or write size; and
X is a pre-determined stream buffer fill point.

In general, autonomous operations in the logical unit and in accordance with the invention may be performed during command execution or between commands.

"During command execution" is the situation described in the flow charts, where the invention solves a fundamental problem with respect to fixed time outs from MMC4. The application allows for a time-out to be specified. But this time-out applies to the execution of each single command—so this is a fixed time-out that is re-started at the arrival of each command. The problem with this definition is that it is not possible to add up time-outs of multiple commands. The time-out of the invention is actually a time-out of a process, and not of a single command, i.e. a flexible or running time-out.

In an alternative embodiment, during the command execution, the drive could test how important an autonomous operation is, and then only start the autonomous operation if that operation is really needed right away, before termination of the data transfer command. In another alternative embodiment, the drive unit could establish limits on the time available to spend on autonomous operations.

The invention can also be used between commands. In these situations, the drive can autonomously and safely execute activities other than transferring data. The timer value of the invention is the running timer for a process rather than for a single command. Therefore, while doing non-data transfer operations in background, the drive is still able to receive new information concerning streaming requirements, command handling being a foreground task.

The time-out value maintained by the invention may become inaccurate if the actual transfer rate to the consumer may vary (due to compression). Therefore, the application needs to update the timer value regularly.

The initiator may issue one command which requires a very large number of sectors to be transferred, but may also issue many commands with a small number of sectors. In the former case, non-data transfer operations can take place during the execution of the command, whereas in the latter case, non-data transfer operations may also take place between commands, so long as an appropriate timer value continues to be transferred to the drive unit. Since the drive unit also has a cache, it may be able to transfer the sectors for a few of these many commands from the cache, while in parallel performing the non-data transfer operation (like retry, error recovery, calibration, etc.)

Figure 6:
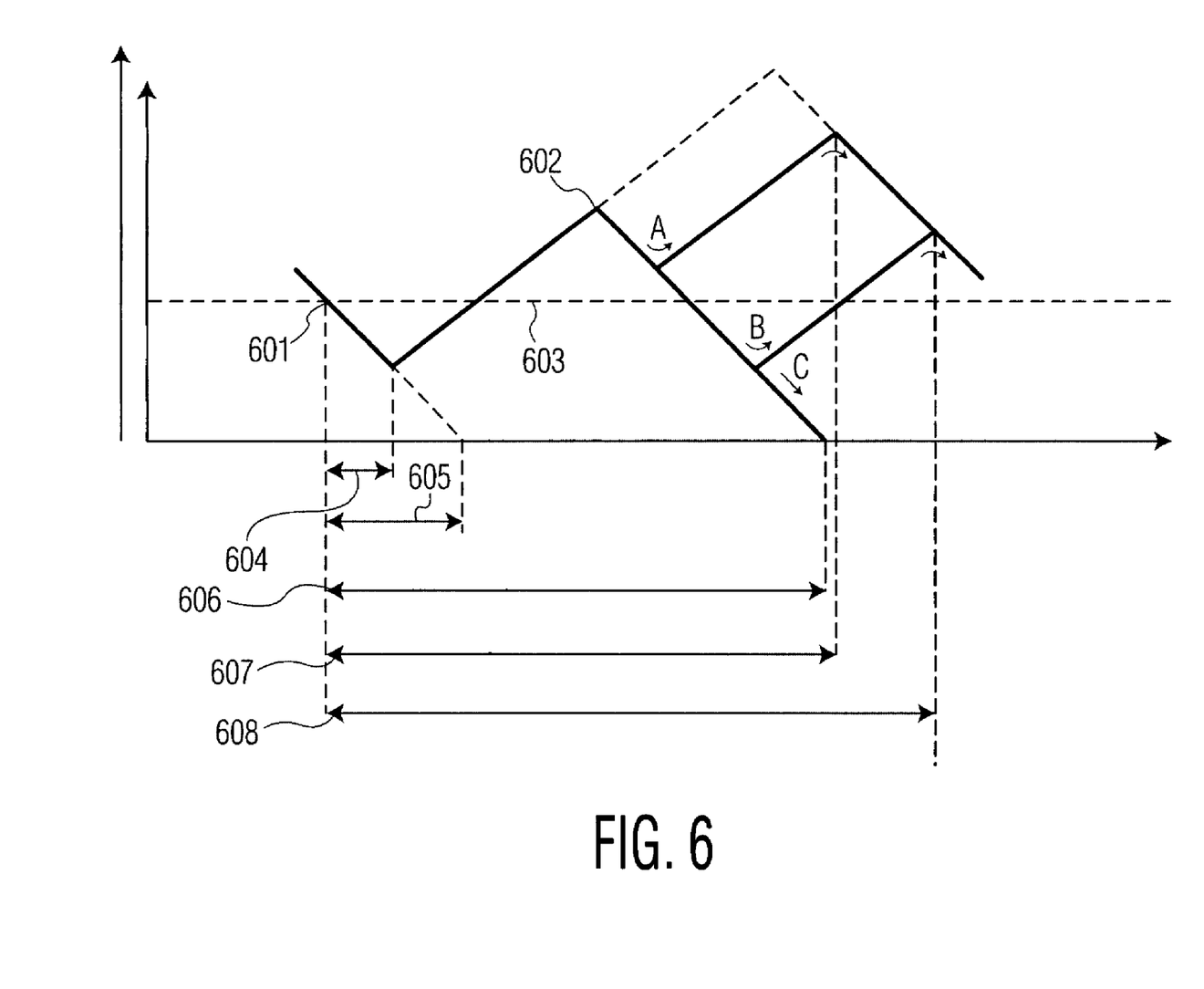
FIG. 6 shows a timing diagram relating to the flowchart of FIGS. 4a and 4b.

It should be noted, however, that "during command execution" does not mean that the drive can necessarily perform a non-data transfer operation in parallel with reading or writing data from or to the storage medium. The drive merely uses the timing calculations of the invention to exploit time when actual data access to the storage medium is not needed FIG. 6 shows a graph of buffer fullness, as a function of elapsed time, during a read operation. An analogous graph would apply for a write operation. At 601, the buffer fullness reaches the jump-back level 603. This serves as a trigger for a read operation. During a first interval 604, fullness continues to go down, until a data transfer actually begins. Reference 605 shows the time interval until a time out, if the data transfer does not occur. Reference 606 shows buffer fullness of situation C, shown in the flow chart at 422, is followed, namely if the autonomous operation takes too long. Reference numerals 607 and 608 refer to time intervals for branches A and B of the timing diagram. Both of these branches relate to successful reads, per block 417, but in branch A, the buffer fullness never falls below the jump back level, while in branch B, the buffer fullness falls below the jump back level without resulting in a time-out.

Commands transmitted between the host unit and the drive may be in a format such as those found in the MMC-4 standard, a draft of which is located at http://www.t10.org/ftp/t10/drafts/mmc4/mmc4r03.pdf. The preferred embodiment makes use of the "SET STREAMING" command to pass parameters relating to the invention. Those of ordinary skill in the art could devise other communications techniques, for instance using other MMC type commands, including existing commands or new commands.

The following will describe command formats that might be suitable for use in an MMC type situation for implementing the invention. These are only examples. Those of ordinary skill in the art might devise other formats or command usages under which the invention would work.

The initiator issues a GET CONFIGURATION command to obtain all the capabilities of the drive unit in terms of profiles and features. Depending on the mounted medium, some profiles and features will be made current.

The currency of a profile defines a base set of features that will be supported by the drive unit. In turn, a feature describes a set of commands and mode pages that specify the capabilites and behavior of the drive unit.

The Feature Descriptor response data for the Real Time Streaming feature to be returned to the Initiator is defined in Table 2.

TABLE 2

Real Time Streaming Feature Descriptor Format

| Byte | Bit 7 | 6 | 5 | 4 | 3 | 2 | 1 | 0 |
|---|---|---|---|---|---|---|---|---|
| 0 | (MSB) | | | Feature Code = 01 07h | | | | (LSB) |
| 1 | | | | | | | | |
| 2 | Reserved | | | Version | | | Persistent | Current |
| 3 | | | | Additional Length = 04h | | | | |
| 4 | Reserved | | ST | RBCB | SCS | MP2A | WSPD | SW |
| 5 | | | | Reserved | | | | |
| 6 | | | | Reserved | | | | |
| 7 | | | | Reserved | | | | |

Most of this is in accordance with the MMC-4 standard, except that a Streamed Timing (ST) bit is added. If the bit is one, that indicates that this Logical Unit supports the Streamed Timing Descriptor of the SET STREAMING command.

Logical Units that support this Feature implement the commands listed in Table 3.

TABLE 3

Real Time Streaming Feature Commands

| Op Code | Command Description | Reference |
|---|---|---|
| ACh | GET PERFORMANCE with Type field of 00h, and Type field 01 h when SW bit is set to one and Type field of 03h when WSPD bit is set to one | MMC-4 |
| A8h | READ (12) | MMC-4 |
| 5Ch | READ BUFFER CAPACITY with Block bit of 1 (Note 1) | MMC-4 |
| B6h | SET STREAMING (Note 2) | MMC-4 |
| A7h | SET READ AHEAD | MMC-4 |
| AAh | WRITE (12) with Streaming bit when SW bit is set to one | MMC-4 |

Note:
1 - Is implemented if RBCB set to 1
2 - WRC field of SET STREAMING command is supported if WSPD bit is set to one.

SET STREAMING Command

Steps 402 and 502 involve using the SET STREAMING command to send the Stream Timing Descriptor to the drive unit.

The SET STREAMING command provides the Initiator with a method to communicate requirements for data rate. The performance setting is persistent and remains until a new descriptor is sent.

If the SET STREAMING Command is used to set performance, the Logical Unit may disable read and write reallocation in the specified region in order to meet the performance criteria.

Table 4 shows the Features associated with the SET STREAMING command.

TABLE 4

Features Associated with the SET STREAMING Command

| Feature Number | Feature Name | Command Requirement |
|---|---|---|
| 0107h | Real-time Streaming | Mandatory |

The CDB and Its Parameters

The SET STREAMING CDB is shown in Table 5.

TABLE 5

SET STREAMING CDB

| Byte | Bit 7 | 6 | 5 | 4 | 3 | 2 | 1 | 0 |
|---|---|---|---|---|---|---|---|---|
| 0 | | | | Operation Code (B6h) | | | | |
| 1 | | | | Reserved | | | | |
| 2 | | | | Reserved | | | | |
| 3 | | | | Reserved | | | | |
| 4 | | | | Reserved | | | | |
| 5 | | | | Reserved | | | | |
| 6 | | | | Reserved | | | | |
| 7 | | | | Reserved | | | | |
| 8 | | | | Type | | | | |
| 9 | (MSB) | | | Parameter List Length | | | | |
| 10 | | | | | | | | (LSB) |
| 11 | | | | Control | | | | |

Type

The Type field (Table 6) specifies which type of data is transferred.

TABLE 6

Type field definition

| Type | Descriptor | Specification |
|---|---|---|
| 00h | Performance Descriptor | |
| 01h | Stream Timing Descriptor | |
| 02h-04h | Reserved | |
| 05h | DBI Cache Zone Descriptor | |

This table describes 3 descriptors that could possibly be sent: a Performance Descriptor (existing in MMC-4), a Stream Timing Descriptor, and a DBI Cache Zone Descriptor (existing in MMC-4).

Command Execution

The SET STREAMING command provides a way for the Initiator to indicate to the logical unit that the application has specific request or requirements for logical unit performance.

Stream Timing Descriptor

The Stream Timing Descriptor, particularly bytes 4-15 of Table 7, below, permits the Initiator and Logical Unit to share timing information for the purpose of maintaining stream continuity.

The Logical Unit shall maintain an Available Timer that represents the time available for stream maintenance. The Available Timer is a down-count timer. If Stream Timing is enabled and the Available Timer reaches zero, then a loss of streaming UNIT ATTENTION condition exists.

TABLE 7

Stream Timing Descriptor

| Byte | Bit 7 | 6 | 5 | 4 | 3 | 2 | 1 | 0 |
|---|---|---|---|---|---|---|---|---|
| 0 | | | | Reserved | | | | Enable |
| 1 | | | | Reserved | | | | Write |
| 2 | | | | Reserved | | | | |
| 3 | | | | Reserved | | | | |
| 4 | (MSB) | | | Initial Stream Timing Value | | | | |
| 5 | | | | | | | | |
| 6 | | | | | | | | (LSB) |
| 7 | | | | | | | | |
| 8 | | | | Reserved | | | | |
| 9 | | | | Reserved | | | | |
| 10 | (MSB) | | | Transfer Unit Size | | | | |
| 11 | | | | | | | | (LSB) |
| 12 | | | | Reserved | | | | |
| 13 | | | | Reserved | | | | |
| 14 | (MSB) | | | Transfer Unit Increment | | | | |
| 15 | | | | | | | | (LSB) |

Enable

When Enable is set to zero, all currently active Stream Timing functions based upon Stream Timing Descriptors are disabled. When Enable is set to one, Stream Timing is enable according to the parameters in the containing descriptor.

Write

When Enable is set to one and Write is set to zero, Stream Timing functions for reading is enabled and Stream Timing for read is initialized according to the parameters in this descriptor.

When Enable is set to one and Write is set to one, Stream Timing functions for writing is enabled and Stream Timing for write is initialized according to the parameters in this descriptor.

Whenever Enable is set to zero, the Write bit is not defined.

Initial Stream Timing Value

The Initial Stream Timing value represents the number of microseconds until a loss of streaming UNIT ATTENTION condition shall exist.

When Enable is set to one, the Logical Unit shall initialize its Available Time timer to the Initial Stream Timing value and start the Available Timer.

Whenever Enable is set to zero, this parameter is not defined.

Transfer Unit Size

The Transfer Unit Size is the preferred number of sectors per transfer.

Transfer Unit Increment

The Transfer Unit Increment is the number of microseconds that is added to the Available Time timer after Transfer Unit Size sectors have been transferred.

From reading the present disclosure, other modifications will be apparent to persons skilled in the art. Such modifications may involve other features which are already known in the design, manufacture and use of devices for data transfer between initiator and logical units and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

The invention claimed is:

1. Apparatus comprising:
  at least one initiator processing unit having a streaming buffer; and
  at least one logical unit having a logical unit buffer;
  wherein the at least one initiator processing unit is adapted to perform processing unit operations including:
    running at least one application
    maintaining the streaming buffer for the at least one application;
    issuing to the at least one logical unit at least one command including parameters
      specifying a data transfer request; and
      allowing the at least one logical unit to estimate the streaming buffer status; and
  wherein the at least one logical unit is adapted to perform logical unit operations including:
    transferring data relative to at least one storage medium, responsive to the data transfer request;
    receiving and storing the parameters;
    based on the parameters and the transferring of the data, estimating the status of the streaming buffer;
    based on the estimated status of the streaming buffer, determining a condition relevant to an autonomous non-data transfer operation;
  feeding the at least one initiator processing unit from the logical unit buffer while the at least one logical unit is performing the autonomous non-data transfer operation.

2. The apparatus of claim 1, wherein
  the application is reading data; and
  the condition is that the autonomous non-data transfer operation is to be attempted between read accesses to the storage medium while the at least one initiator processing unit does not need more data in the streaming buffer.

3. The apparatus of claim 1, wherein
  the application is writing data; and
  the condition is that the autonomous non-data transfer operation is attempted between write accesses to the storage medium while the at least one initiator processing unit does not need to remove data from the streaming buffer.

4. The apparatus of claim 1, wherein the condition allows the non-data transfer operation to occur while issuing a time out error message.

5. The apparatus of claim 1, wherein the logical unit operations comprise:
  determining that the particular autonomous non-data transfer operation has taken longer than the time remaining before another data transfer is required; and
  sending an error message to the at least one initiator processing unit in response to such a determination.

6. The apparatus of claim 1, wherein the at least one logical unit tests whether there is time to initiate a the autonomous non-data transfer operation, prior to such initiation.

7. The apparatus of claim 1, wherein the autonomous non-data transfer operation is an error recovery operation.

8. The apparatus of claim 1, wherein the autonomous non-data transfer operation relates to physical maintenance of at least one drive mechanism or at least one storage medium of the at least one logical unit.

9. The apparatus of claim 1, wherein the autonomous non-data transfer operation relates to relative positioning between at least one drive mechanism and the at least one data storage medium of the logical unit.

10. The apparatus of claim 1, wherein the parameters include:
an initial stream timing value;
a transfer unit size;
a transfer unit increment;
a write flag, indicating whether a read or write operation is desired.

11. A method of controlling a drive unit having logical unit buffer, the method comprising the acts of:
maintaining a streaming buffer of an initiator for an application running on the initiator;
issuing from the initiator to the drive unit at least one command, the at least one command including parameters specifying a data transfer request, and
wherein the drive unit determines the streaming buffer status based on the parameters;
transferring by the drive unit data relative to a storage medium, responsive to the data transfer request;
receiving and storing the parameters by the drive unit; and
based on the parameters and the transferring of data, calculating by the drive unit a status of the streaming buffer;
based on the calculated status of the streaming buffer, determining by the drive unit a condition relevant to an autonomous non-data transfer operation; and
feeding the initiator from the logical unit buffer while the drive unit is performing the autonomous non-data transfer operation.

* * * * *